US011467756B1

(12) United States Patent
Shankar D H et al.

(10) Patent No.: US 11,467,756 B1
(45) Date of Patent: Oct. 11, 2022

(54) SYSTEM AND METHOD FOR SERVICE DEVICE INITIATED BACKUP GENERATION

(71) Applicant: EMC IP Holding Company LLC, Hopkinton, MA (US)

(72) Inventors: Swaroop Shankar D H, Bangalore (IN); Mahesh Reddy Appireddygari Venkataramana, Bangalore (IN); Chetan Battal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 17/231,872

(22) Filed: Apr. 15, 2021

(51) Int. Cl.
  *G06F 12/00* (2006.01)
  *G06F 3/06* (2006.01)

(52) U.S. Cl.
  CPC .............. *G06F 3/065* (2013.01); *G06F 3/067* (2013.01); *G06F 3/0619* (2013.01); *G06F 3/0659* (2013.01)

(58) Field of Classification Search
  None
  See application file for complete search history.

(56) References Cited

U.S. PATENT DOCUMENTS

| 2018/0144149 A1* | 5/2018 | Andrews | G06F 11/1446 |
| 2018/0284986 A1* | 10/2018 | Bhagi | G06F 3/0664 |
| 2021/0049077 A1* | 2/2021 | Gibbons, Jr. | G06F 11/3058 |

OTHER PUBLICATIONS

VMware, Inc. (May 31, 2019). "Virtual Disk Rate (KBps)", <https://docs.vmware.com/en/VMware-vSphere/7.0/com.vmware.vsphere.monitoring.doc/GUID-3F106A1C-14B2-4EB4-BD99-6B93094F3955.html> (3 pages).
VMware, Inc. (May 31, 2019). "Virtual Disk Requests (Number)", <https://docs.vmware.com/en/VMware-vSphere/7.0/com.vmware.vsphere.monitoring.doc/GUID-076B5225-E67D-4C79-AC33-7D35B448EC83.html> (3 pages).

* cited by examiner

*Primary Examiner* — Daniel D Tsui
(74) *Attorney, Agent, or Firm* — Chamberlain, Hrdlicka, White, Williams & Aughtry

(57) ABSTRACT

A backup management system includes storage and a processor. The processor filters copies of storage system transactions of a service device using a block level filter to identify a portion of the storage system transactions impacting a protected data asset; obtains at least one data protection metric based on the portion of the storage system transactions; makes a determination that the at least one data protection metric indicates that the backup schedule will not provide the protected data asset with a predetermined level of data protection; in response to the determination: generates a service-device initiated backup for the protected data asset; stores the service-device initiated backup in backup storage; and remediates a backup schedule for the service device based on the service-device initiated backup.

20 Claims, 11 Drawing Sheets

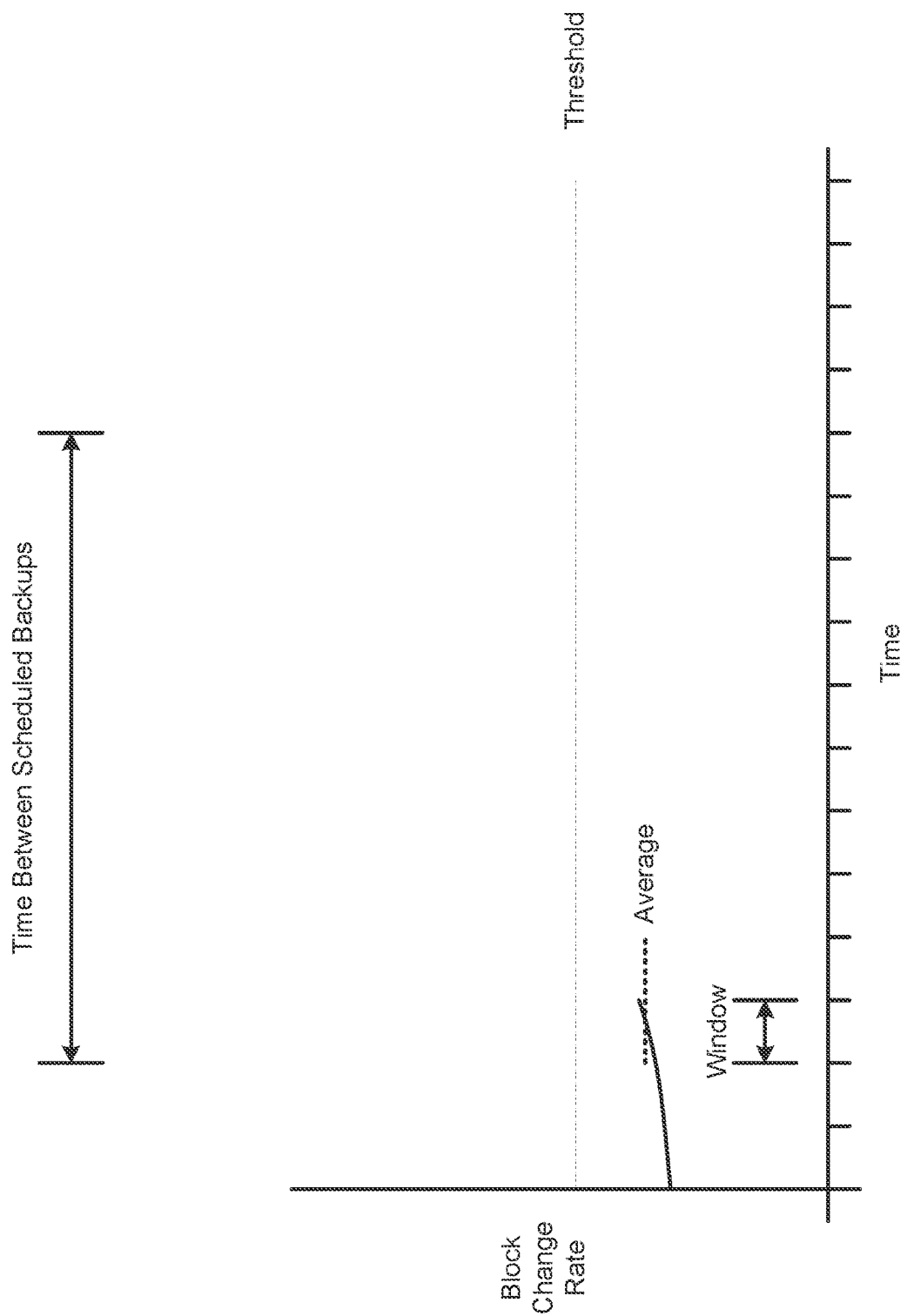
FIG. 5.1

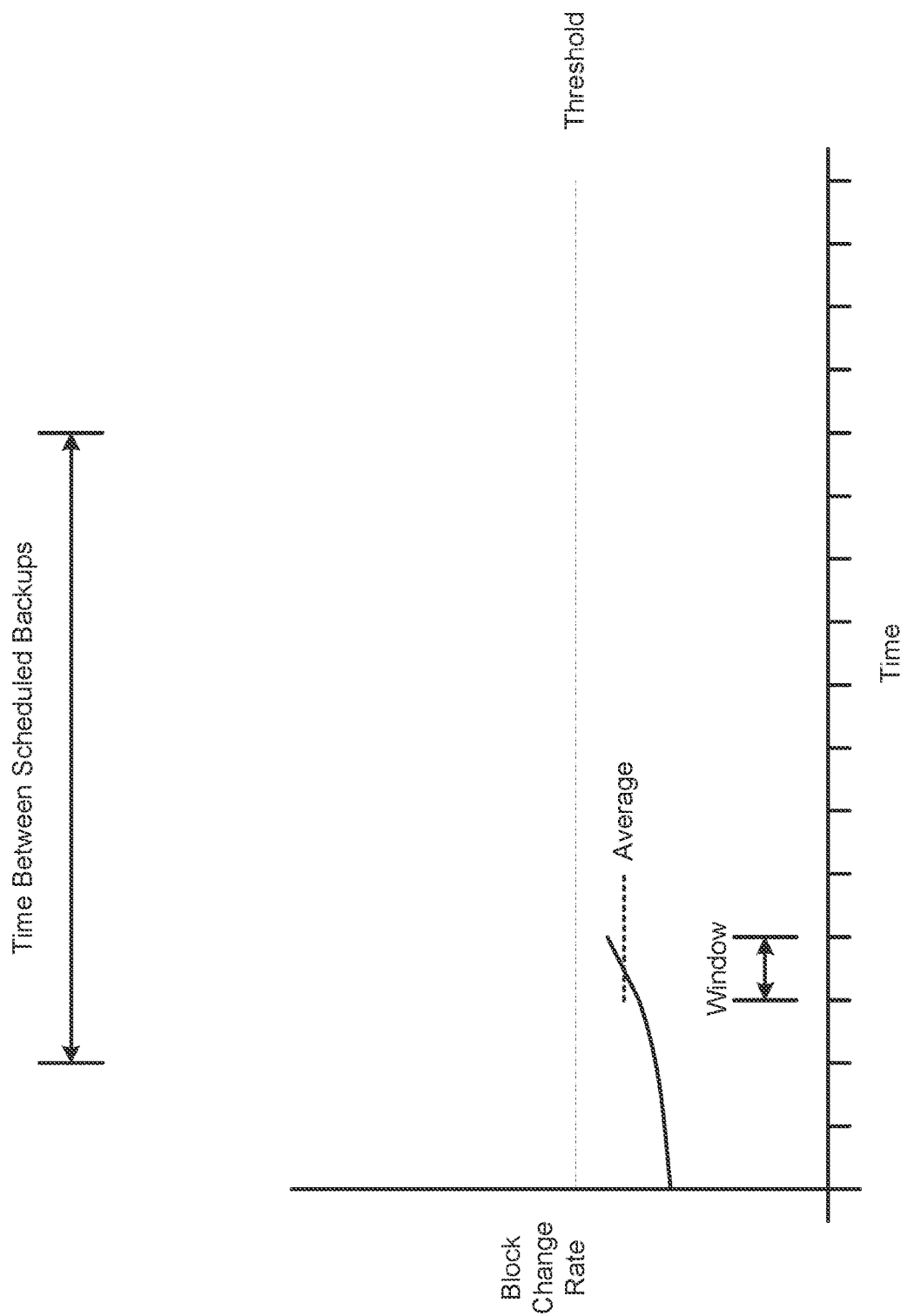
FIG. 5.2

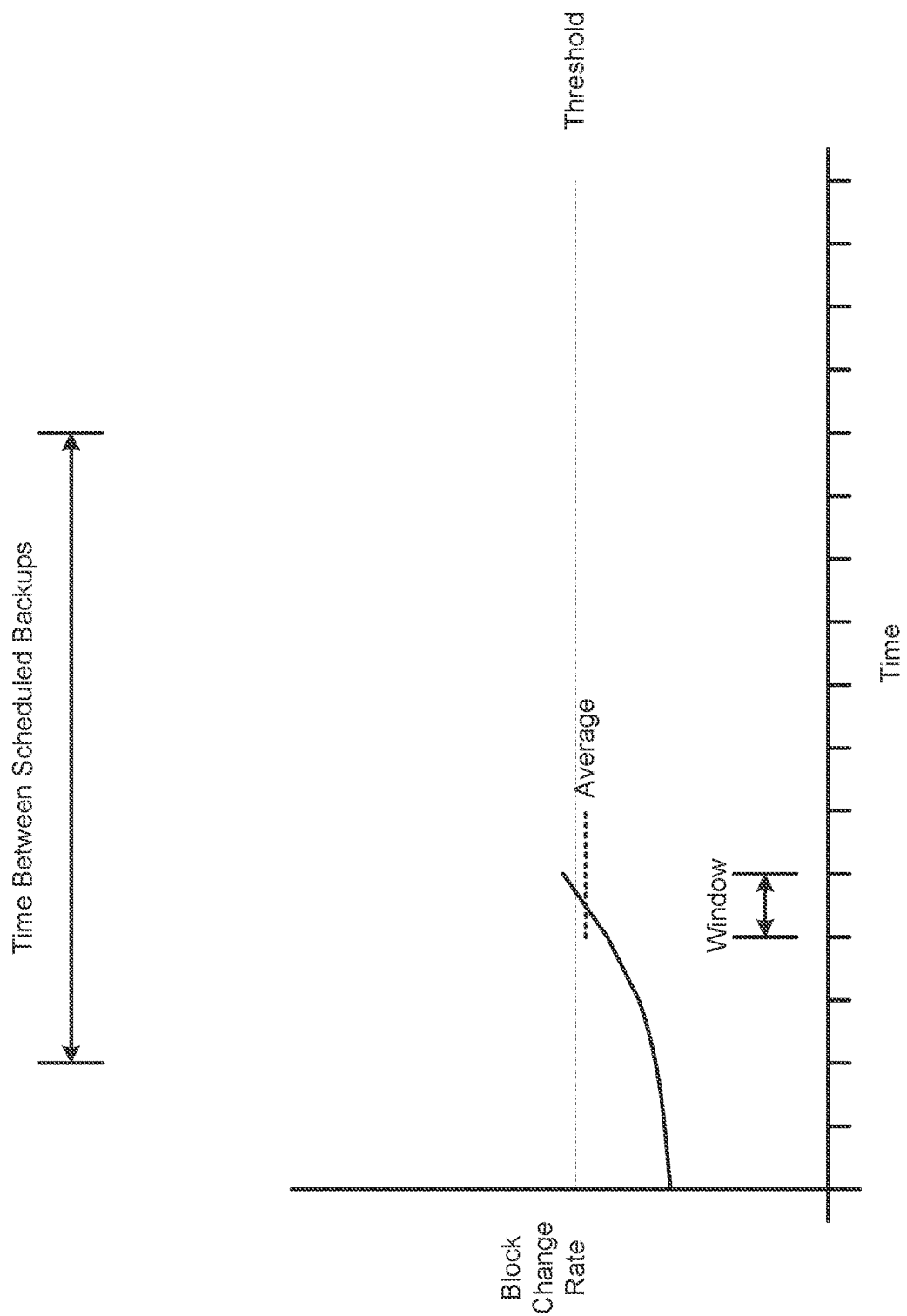
FIG. 5.3

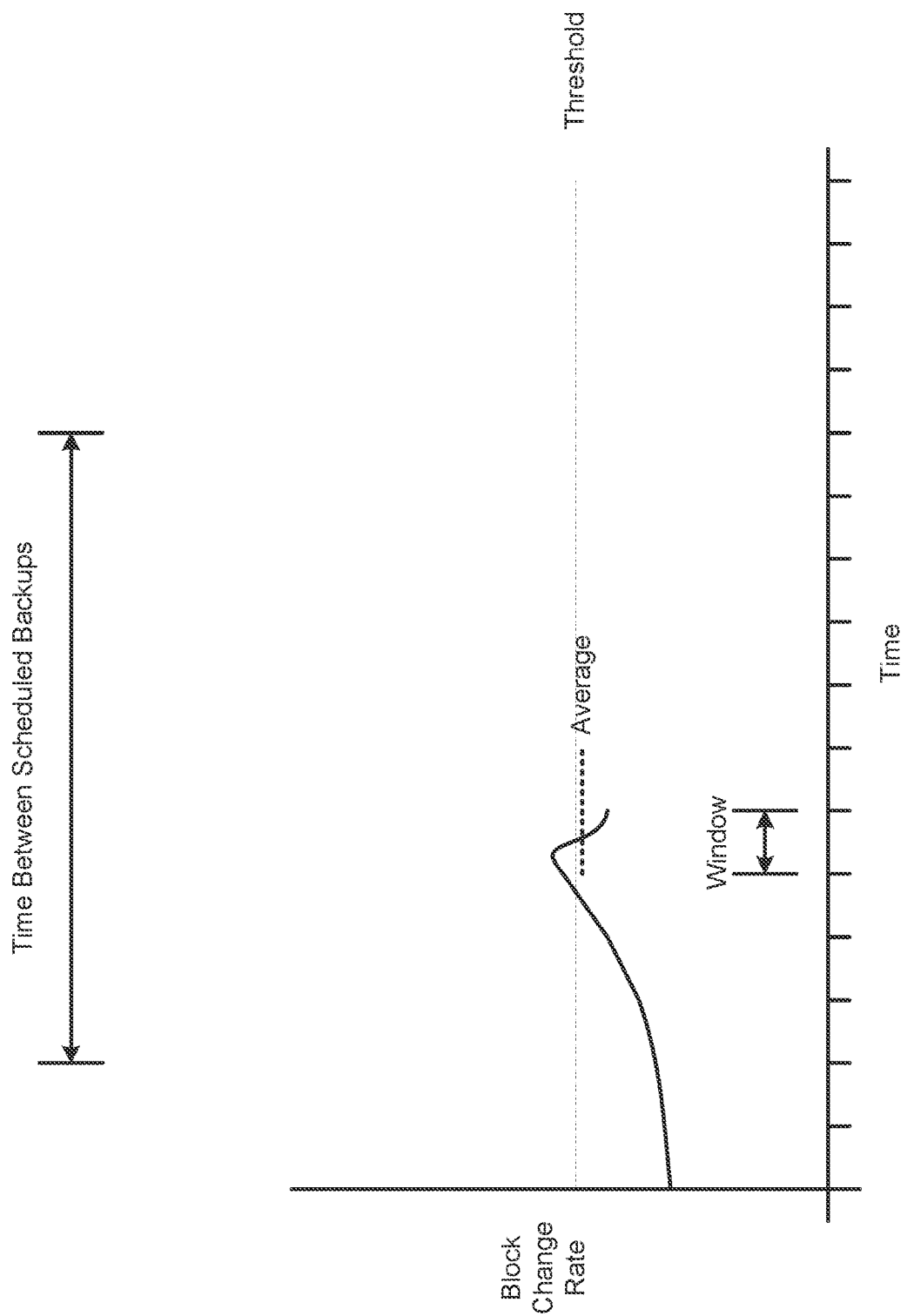
FIG. 5.4

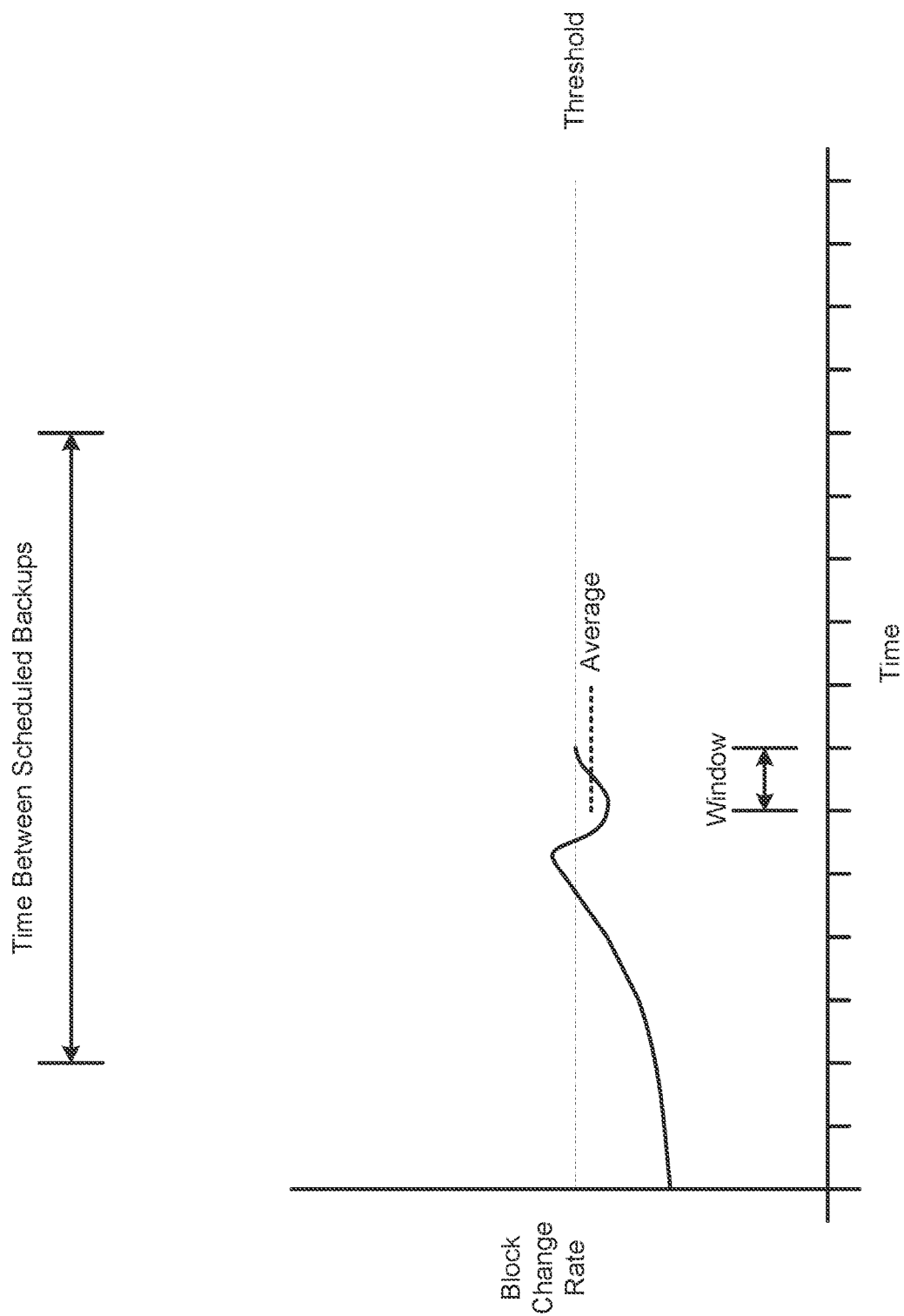
FIG. 5.5

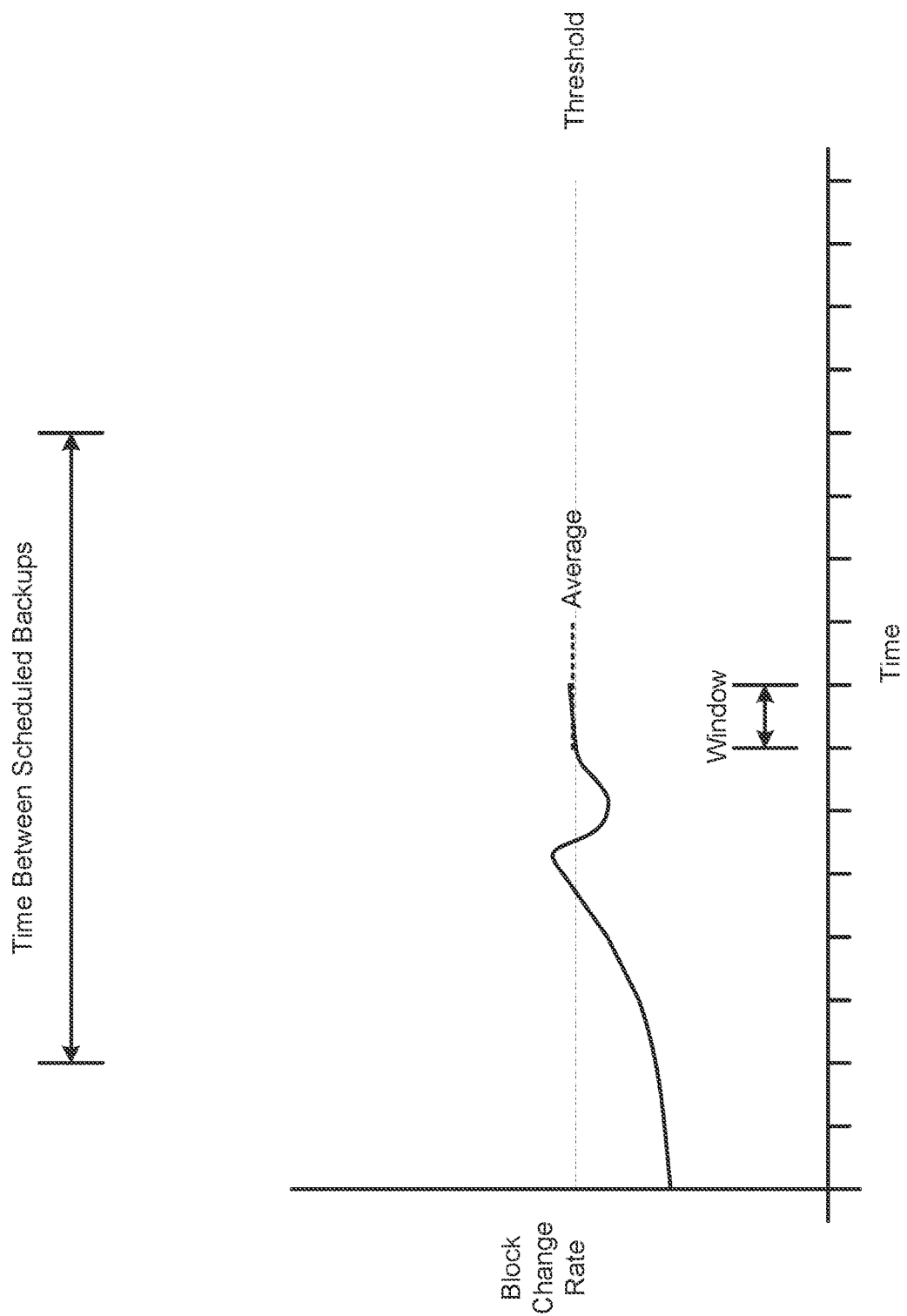
FIG. 5.6

SYSTEM AND METHOD FOR SERVICE DEVICE INITIATED BACKUP GENERATION

BACKGROUND

Computing devices may provide services. To provide the services, the computing devices may include hardware components and software components. The services provided by the computing devices may be limited by these components.

SUMMARY

In one aspect, a backup management system for providing data protection services to service devices that provide computer implemented services for clients and host protected data assets used to provide the computer implemented services to the clients in accordance with one or more embodiments of the invention includes storage for storing a backup schedule for a protected data asset of the protected data assets hosted by a service device of the service devices, and a conditional backup generation repository that specifies when un-scheduled backups for the service device are to be generated. The backup management system also includes a processor that filters copies of storage system transactions of the service device using a block level filter to identify a portion of the storage system transactions impacting the protected data asset; obtains at least one data protection metric based on the portion of the storage system transactions; makes a determination that the at least one data protection metric indicates that the backup schedule will not provide the protected data asset with a predetermined level of data protection; in response to the determination: generates a service-device initiated backup for the protected data asset; stores the service-device initiated backup in backup storage; and remediates the backup schedule based on the service-device initiated backup.

In one aspect, a method for providing data protection services to service devices that provide computer implemented services for clients and host protected data assets used to provide the computer implemented services to the clients in accordance with one or more embodiments of the invention includes filtering copies of storage system transactions of a service device of the service devices that hosts a protected data asset of the protected data assets using a block level filter to identify a portion of the storage system transactions impacting the protected data asset; obtaining at least one data protection metric for the protected data asset based on the portion of the storage system transactions; making a determination that the at least one data protection metric indicates that a backup schedule will not provide the protected data asset with a predetermined level of data protection; in response to the determination: generating a service-device initiated backup for the protected data asset; storing the service-device initiated backup in backup storage; and remediating the backup schedule based on the service-device initiated backup.

In one aspect, a non-transitory computer readable medium in accordance with one or more embodiments of the invention includes computer readable program code, which when executed by a computer processor enables the computer processor to perform a method for providing data protection services to service devices that provide computer implemented services for clients and host protected data assets used to provide the computer implemented services to the clients. The method includes filtering copies of storage system transactions of a service device of the service devices that hosts a protected data asset of the protected data assets using a block level filter to identify a portion of the storage system transactions impacting the protected data asset; obtaining at least one data protection metric for the protected data asset based on the portion of the storage system transactions; making a determination that the at least one data protection metric indicates that a backup schedule will not provide the protected data asset with a predetermined level of data protection; in response to the determination: generating a service-device initiated backup for the protected data asset; storing the service-device initiated backup in backup storage; and remediating the backup schedule based on the service-device initiated backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5.1-5.6 show diagrams of the operation of a system similar to that of FIG. 1 over time in accordance with one or more embodiments of the invention.

DETAILED DESCRIPTION

Figure 1:
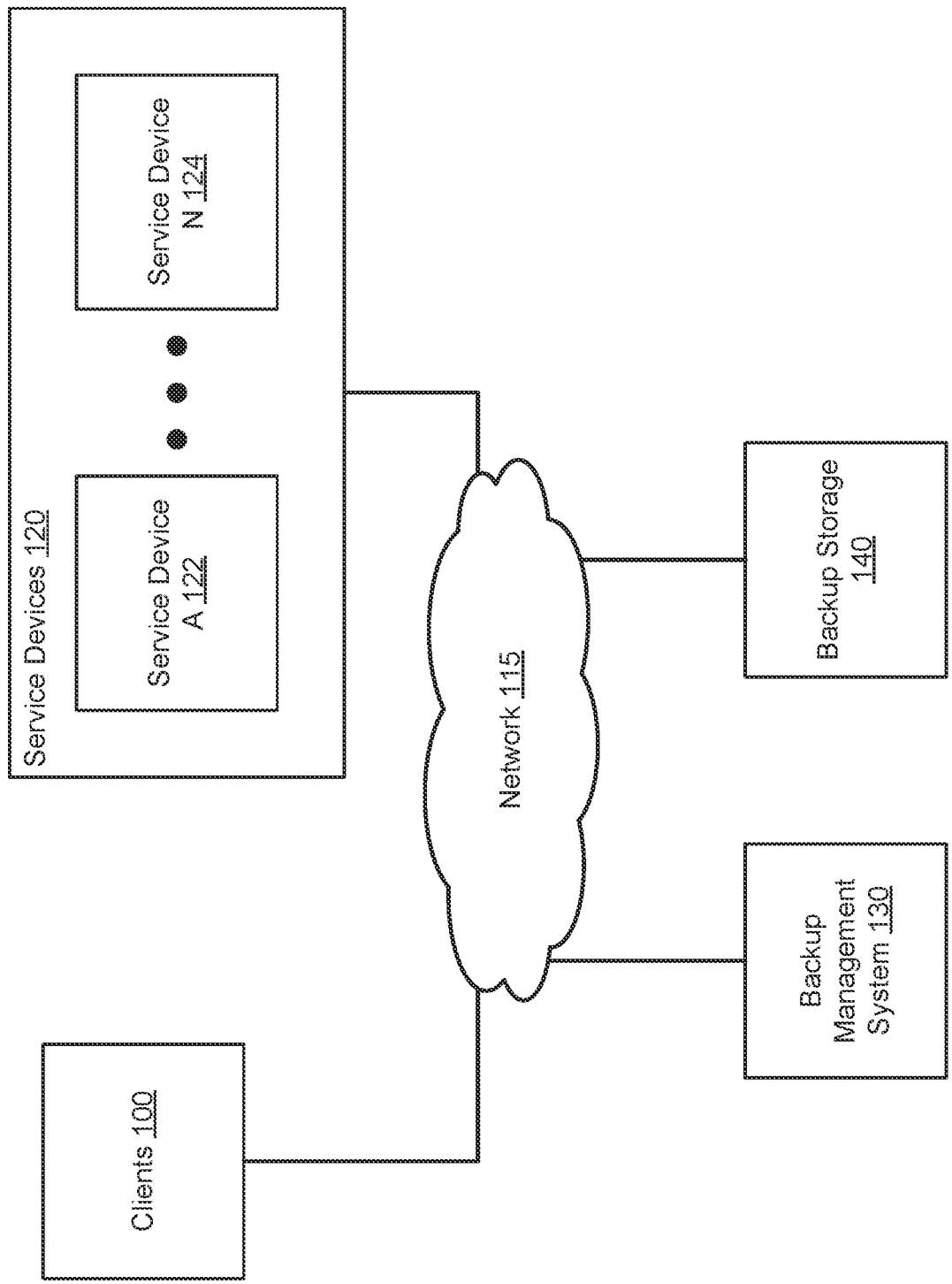
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing data protection services. Data protection services may include storage of information usable to restore a protected asset after the protected asset has become inoperable, unresponsive, etc. The data protection services may be provided in a manner to comply with data protection goals, policies, etc. that specify acceptable levels of deviation from perfect data protection (e.g., data that cannot be lost due to the data protection services). The levels of deviation may be, for example, a predetermined amount of data of a protected asset that may be lost even though data protection services for the protected asset are provided.

To provide data protection services, scheduled backups (e.g., backups of an entity usable to restore the entities generated at predetermined points in time) may be generated in accordance with a backup scheduled. To generate the backups, an agent hosted by a protected asset (e.g., a service device) may generate scheduled backups in accordance with the backup schedule. The backup scheduled may be designed to make it likely that the scheduled backups will prevent the quantity of data that may be lost from exceeding the predetermined amount of data of the protected asset that may be lost.

However, the scheduled backups may be insufficient to limit the amount of lost data from protected assets (also referred to as protected data assets herein) to be less than the predetermined amount of data of the protected asset that may be lost. For example, if a protected asset sees a large increase in changes to its data, scheduled backups may be insufficient to provide the data with the prescribed level of protection.

Embodiments of the invention may facilitate the automatic generation of service device initiated backups. A service device initiated backup may be a backup for a protected asset that is not initiated in accordance with a backup schedule. Rather, the service device initiated backup may be initiated based on the occurrence of an operation condition of the protected asset, a service device that hosts the protected asset, a system in which the service device resides, etc. These service device initiated backups may reduce the likelihood that the quantity of data of protected assets that is subject to loss exceeds the predetermined amount of data of the protected asset that may be lost.

To do so, the generation of service device initiated backups may be (i) initiated by the service devices and (ii) based on rates of changes of blocks that store any quantity of data of the protected asset. By doing so, service device initiated backups may automatically be generated during conditions in which it is likely that the quantity of data of protected assets that is subject to loss exceeds the predetermined amount of data of the protected asset that may be lost, thereby eliminating or reducing the likelihood of lost data exceeding the predetermined amount of data of the protected asset that may be lost.

Additionally, by also generating service device initiated backups, backup schedules may be set more aggressively.

For example, the period of time between backups may be extended because unexpected increases in rates of changes of data of protected assets may be unlikely to be problematic for data protection purposes due to the generation of the service device initiated backups.

By doing so, a system in accordance with embodiments of the invention may be more likely to meet data protection requirements while more efficiently marshalling limited computing resources by reducing the rate at which backups are generated (e.g., by increasing the period of time between scheduled backups). Further, by reducing reliance on scheduled backups for complying with data protection requirements, the cognitive burden on administrators of the system may be reduced by making it less likely that improper backup scheduled calculation will result in data protection policy compliance failures.

Turning to FIG. 1, FIG. 1 shows a system in accordance with one or more embodiments of the invention. The system may include any number of clients (100). The clients (100) may provide computer implemented services to users of the clients (100) (and/or other devices such as, other clients or other types of devices). The clients (100) may provide any number and type of computer implemented services (e.g., data storage services, electronic communication services, etc.).

To provide computer implemented services, the entities hosted by the clients (e.g., applications) may utilize information from any number of sources. For example, the clients (100) may utilize information stored in service devices (120) operably connected to the clients (100) by one or more networks (e.g., 115). The clients (100) may utilize information from other sources without departing from embodiments of the invention.

The service devices (120) may provide computer implemented services to the clients (100) and/or other devices. For example, the clients (100) may host databases used to provide database services to the clients. The database services may include storing information in the database and providing information stored in the databases to the clients (100) and/or other entities. The computer implemented services may be other types of services (e.g., electronic communications, video streaming, data analysis, etc.) without departing from the invention.

When the service devices (120) provide computer implemented services to the clients (100), any of the service devices (e.g., 122, 124) may store information that may be relevant to the clients (100). When client relevant data is stored (e.g., locally) by one of the service devices (120), the client relevant data may be subject to loss, inaccessibility, or other undesirable characteristics based on the operation of the service device storing the data.

To mitigate, limit, and/or prevent such undesirable characteristics, the users (e.g., persons, administrators, organization, etc.) of the clients (100) may enter into agreements (e.g., service level agreements) with the users (e.g., persons, administrators, organization, etc.) of the service devices (120). These agreements may limit the potential exposure of client relevant data to undesirable characteristics. The agreements may, for example, require duplication of client relevant data to other locations so that if a service device fails, another copy (or other data structure usable to recover the data on the service device) of the client relevant data may be obtained. The agreements may specify other types of activities to be performed with respect to the service devices without departing from the invention.

To specify a level of exposure to which the client relevant data is subject to undesirable characteristics, the agreements may specify, for example, metrics that govern whether the users of the service devices (120) are in compliance with the agreements. The metrics may include, for example, a maximum quantity of client relevant data that may be exposed to loss, degradation, and/or other undesired characteristic.

To attempt to meet the requirements of these agreements, user of the service devices (120) may utilize a backup management system (130) to attempt to meet these requirements. The backup management system (130) may manage a process of generating backups (e.g., data structures usable to obtain copies of data stored on the service devices) of the service devices. The users of the backup management system (130) may specify a schedule for when backups of the service devices (120) are to be generated. The backup management system (130) may automatically initiate backup generation and storage in accordance with the schedule.

The schedule may be set by users (e.g., administrators, managers, other persons) to comply with the level of client relevant data exposure specified in the agreements. For example, the users may take into account (i) the average rate at which client relevant data stored in the service devices (120) is being modified and (ii) the maximum allowable quantity of client relevant data that may be exposed to loss when setting the backup schedule. The users may periodically review these characteristics and update the backup schedule accordingly.

However, in today's modern computing environment, assumptions regarding the future likely use of the service devices (120) may be inaccurate. For example, spiking usage rates due to viral marketing, social media dissemination of information, and/or other factors may make such assumptions (and correspondingly set backup schedules) inaccurate. If these assumptions turn out to be inaccurate in practice, users of the service devices (120) may be in violation of the agreements with the users of the clients (100).

In general, embodiments of the invention relate to systems, devices, and methods for providing service device initiated backup functionality. Service device initiated backup functionality may refer to a process of generating backups and storing the backups in backups storage (e.g., 140) based on operational conditions of the service devices (120). Such service device initiated backup functionality may not depend on a backup schedule. In contrast to scheduled backups which may be generated based on a schedule, service device initiated backups may (i) not be generated in accordance with a schedule and (ii) may be generated in accordance with operational condition(s) of one or more service devices (120).

The service device initiated backups may be generated in response to operational conditions of the service devices that indicate that scheduled backups (generated and/or to-be-generated) will not be able to meet the requirements of one or more agreements. If such a determination is made, then a service device initiated backup may be generated.

When a service device initiated backup is generated, the backup schedule may be remediated due to the reduced quantity of client relevant data that is subject to the occurrence of undesirable characteristics due to, for example, inoperability of a service device. Remediating the backup schedule may include, for example, pushing the generation of scheduled backups into the future. By doing so, fewer computing resources may be consumed (when compared to continuing to generate schedule backups in accordance with the original backup schedule) while still meeting the requirements of agreements entered into by the users of the service devices (120). For additional details regarding the backup management system (130) and/or service devices (120), refer to FIGS. 2 and 3.

The backup storage (140) may provide backup storage services. The backup storage services may include storing backups from the service devices (and/or other entities) and/or providing copies of the backups and/or information derived from the stored backups to other entities. Such backups may be utilized to perform restorations of the service devices (120) (and/or other entities).

A restoration may be a process of modifying the operation of a device (e.g., a service device that has failed, another device, etc.) to operate in accordance with a previous state of a service device or another device. To restore a device, a new instance of the device may be generated (e.g., by loading software onto a computing device). Data, based on one or more backups stored in the backup storage (140), may be made accessible to the software. The data may be associated with the previous state to which the device is being restored. Consequently, the software may begin using the data thereby causing the software to operate in accordance with the previous state. The backups stored in the backup storage (140) may be usable to restore devices to any number of previous states without departing from the invention.

The backup storage (140) may be independent (and/or may be in a different fault domain) from the service devices (120) (and/or other devices for which the backup storage (140) stores backups). Consequently, a failure of a service device may be less likely to impact the ability of the backup storage (140) to provide its services. For example, the backup storage (140) may be stored in a different geographic location with respect to the locations of the service devices (120), may be implemented as a different device in a data center in which the service devices (120) reside, etc.

The system of FIG. 1 may include any number of clients (100), services devices (120), backup management systems (e.g., 130), and backup storages (e.g., 140). Any of the components of FIG. 1 may be operably connected to any other component and/or other components not illustrated in FIG. 1 via one or more networks (e.g., 115). The networks (e.g., 115) may be implemented using any combination of wired and/or wireless network topologies. The networks may employ any number and types of communication schemes to enable the clients (100), service devices systems (e.g., 120), backup management systems (e.g., 130), and backup storages (e.g., 140) to communicate with each other.

The clients (100), service devices systems (e.g., 120), backup management systems (e.g., 130), and backup storages (e.g., 140) may be implemented using computing devices. The computing devices may include, for example, a server, laptop computer, a desktop computer, a node of a distributed system, etc. (e.g., one or more being part of an information handling system). The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100), service devices systems (e.g., 120), backup management systems (e.g., 130), and/or backup storages (e.g., 140) described in this application and/or all, or a portion, of the method illustrated in FIG. 4. The clients (100), service devices systems (e.g., 120), backup management systems (e.g., 130), and backup storages (e.g., 140) may be implemented using other types of computing devices without departing from the invention. For additional details regarding computing devices, refer to FIG. 6.

While the system of FIG. 1 has been illustrated and described as including a limited number of specific components, a system in accordance with embodiments of the invention may include additional, fewer, and/or different components without departing from the invention.

Figure 2:
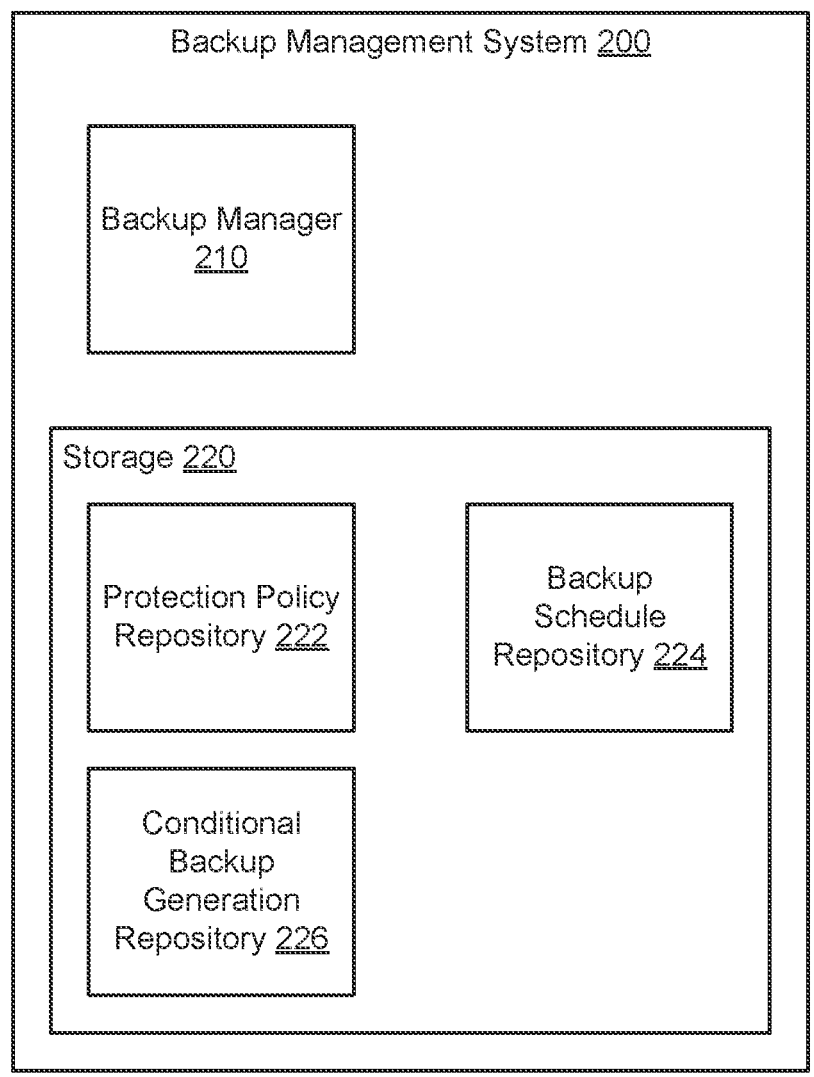
FIG. 2 shows a diagram of a backup management system in accordance with one or more embodiments of the invention.

Turning to FIG. 2, FIG. 2 shows a diagram of a backup management system (200) in accordance with one or more embodiments of the invention. The system of FIG. 1 may include any number of backup management systems (e.g., 130) similar to the backup management system (200) illustrated in FIG. 2. The backup management system (200) may provide data protection services to any number of entities (e.g., all or a portion of the service devices illustrated in FIG. 1).

To provide data protection services, the backup management system (200) may include a backup manager (210) and storage (220). Each of these components is discussed below.

The backup manager (210) may provide the data protection services. The data protection services may include (i) obtaining backups of protected entities (e.g., service devices) and (ii) using the obtained backups to restore the protected entities to previous states.

To obtain the backups, the backup manager (210) may generate (i) scheduled backups and (ii) service device initiated backups. The backup manager (210) may generate these backups to meet the requirements specified by any number of protection policies stored in a protection policy repository (222).

To generate scheduled backups, the backup manager (210) may generate (and/or obtain) one or more backup schedules and store them in a backup schedule repository. A backup schedule may specify information regarding the generation of scheduled backups such as, for example, when scheduled backups are to be generated, how scheduled backups are to be generated, where scheduled backups are to be stored, etc.

To generate service device initiated backups, the backup manager (210) may generate (and/or obtain) one or more conditional backup generation operating conditions for one or more protected devices. The conditional backup generation operating conditions may specify one or more conditions that, if met by a protected device, indicate that scheduled backups for the protected device will not provide sufficient protection to meet the requirements of the agreements (e.g., specified by protection policies of the protection policy repository). The conditional backup generation operation conditions may also specify that, if met, a service device initiated backup should be generated in response to the conditional backup generation operation conditions being met. The conditional backup generation operation conditions may also specify how service device initiated backups are to be generated, where service device initiated backups are to be stored, etc.

To generate scheduled and/or service device initiated backup generations to be generated in accordance with backup schedules and/or conditional backup generation operation conditions, the backup manager (210) may program one or more agents hosted by one or more service devices to initiate generation and storage in backup storage of backups based on (i) backup schedules and/or (ii) conditional backup generation operating conditions corresponding to the service device hosting the respective instances of the agents. By doing so, the backup management system (200) may distribute the computational load for orchestrating backup generation and storage across the system of FIG. 1. Accordingly, the backup management system (200) may not operate as a bottleneck for the provisioning of data protection services across the distributed system.

The backup manager (210) may program the agent using any command and control scheme (e.g., message passing, publish-subscribe, etc.) without departing from the invention. As used herein, programming an agent may refer to a process of providing information to an agent that modifies the operation of the agent. For example, the backup manager (210) may provide a backup schedule and/or information regarding a backup schedule to cause the agent to be programmed to initiate generation of backups by a service device in accordance with the backup schedule.

Figure 4:
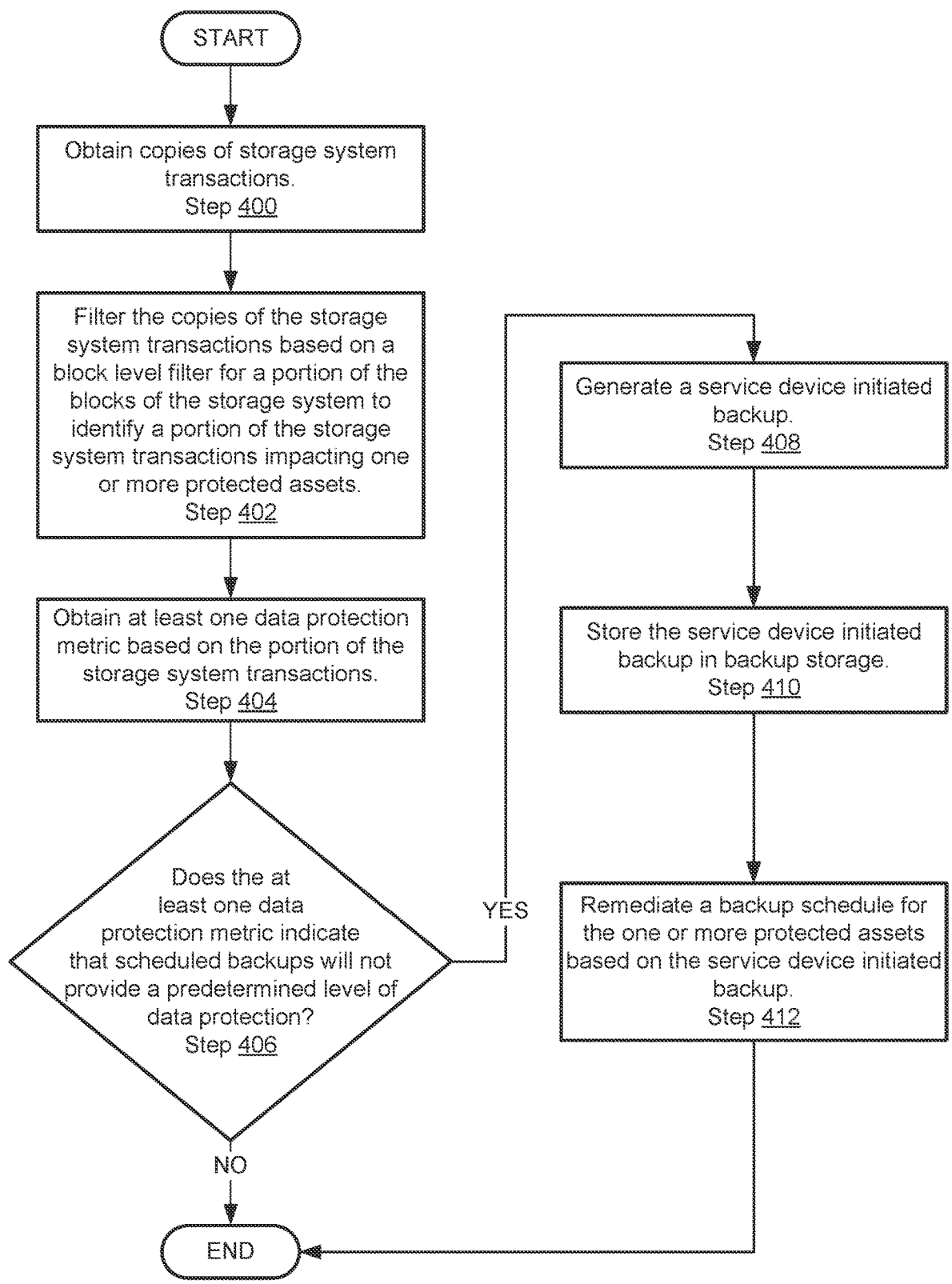
FIG. 4 shows a flowchart of a method of providing data protection services in accordance with one or more embodiments of the invention.

When providing its functionality, the backup manager (210) may perform all, or a portion, of the method illustrated in FIG. 4.

In one or more embodiments of the invention, the backup manager (210) is implemented using a hardware device including circuitry. The hardware device may be, for example, a digital signal processor, a field programmable gate array, or an application specific integrated circuit. The circuitry may be adapted to cause the hardware device to perform the functionality of the backup manager (210). The backup manager (210) may be implemented using other types of hardware devices without departing from the invention.

In one or more embodiments of the invention, the backup manager (210) is implemented using a processor adapted to execute computing code stored on a persistent storage that when executed by the processor performs the functionality of the backup manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, a protection policy repository (222), a backup schedule repository (224), and/or a conditional backup generation repository (226). Each of these data structures is discussed below.

The protection policy repository (222) may be implemented using one or more data structures that includes information regarding the agreements governing client relevant data, accessibility of the client relevant data, allowable loss exposure levels of the client relevant data, and/or other information regarding the client relevant data.

The backup manager (210) may use the information included in the protection policy repository (222) to generate backup schedules and/or conditional backup generation operation conditions. For example, the backup manager (210) may generate conditional backup generation operation conditions to ensure that limits on the maximum allowable quantity of client relevant data subject to data loss are not exceeded.

The protection policy repository (222) may be maintained by, for example, the backup manager (210). For example, the backup manager (210) may add, remove, and/or modify information included in the protection policy repository (222) (e.g., as specified, for example, by an administrator or other person).

The data structures of the protection policy repository (222) may be implemented using, for example, lists, tables, unstructured data, databases, etc. While illustrated in FIG. 2 as being stored locally, the protection policy repository (222) may be stored remotely and may be distributed across any number of devices without departing from the invention.

The backup schedule repository (224) may be implemented using one or more data structures that includes information regarding the generation of scheduled backups. For example, the backup schedule repository (224) may specify when, how, and where scheduled backups for service devices and/or other entities are to be generated and/or stored.

The backup manager (210) may use the information included in the backup schedule repository (224) to program agents thereby implementing the backup policies. For example, the backup manager (210) may provide backup schedules and/or information derived from the backup schedules to agents.

The backup schedule repository (224) may be maintained by, for example, the backup manager (210). For example, the backup manager (210) may add, remove, and/or modify information included in the backup schedule repository (224) (e.g., as specified, for example, by an administrator or other person).

The backup schedule repository (224) may include backup schedules generated by, for example, administrators, managers, and/or other persons tasked with ensuring that the system of FIG. 1 meets the requirements of the protection policies of the protection policy repository (222). However, the backup schedules may in some cases fail to provide a required level of protection specified by the protection policy repository (222).

The data structures of the backup schedule repository (224) may be implemented using, for example, lists, tables, unstructured data, databases, etc. While illustrated in FIG. 2 as being stored locally, the backup schedule repository (224) may be stored remotely and may be distributed across any number of devices without departing from the invention.

The conditional backup generation repository (226) may be implemented using one or more data structures that includes information regarding the generation of service device initiated backups. For example, the conditional backup generation repository (226) may specify when, how, and where service device initiated backups for service devices and/or other entities are to be generated and/or stored.

The conditional backup generation repository (226) may specify one or more conditions that when met trigger generation of a service device initiated backup. The conditions may be based on operational conditions of a service device.

For example, the operation condition may be a generation rate of client relevant data during a period of time. The period of time may be a fraction of a backup period (e.g., time between when a backup schedule indicates that scheduled backups are to be generated). The fraction may be, for example, one tenth of a backup period, one fifth of a backup period, etc. The generation rate of the client relevant data may be based on a maximum allowable quantity of client relevant data that is exposed to potential loss or other undesirable characteristic. For example, the maximum allowable quantity may be divided by the number of periods of time in a backup period to identify the allowable quantity per time period. The generation rate may be calculated by dividing the allowable quantity by the time period.

In one or more embodiments of the invention, the operation condition may be based on changes to blocks rather than the actual quantity of changed client relevant data. For example, when client relevant data is stored in a service device storage, it may be stored in any number of physical blocks (e.g., minimum addressable unit of storage). However, the quantity of the client relevant data modified in each block may be computationally difficult to identify (e.g., write requests may need to be individually analyzed). To avoid the computational expense associated with block level analysis, it may be presumed that whenever a block storing client relevant data is modified, the modified block represents a quantity of modified client relevant data equivalent to the size of the block (as opposed to an actual quantity of client relevant data in the block so modified).

In such a scenario, the operation condition may be a change rate in the blocks storing client relevant data rather than the rate of change of the client relevant data itself. The change rate may be based similarly on the total acceptable quantity of exposed client relevant data during a backup period. For example, the total quantity of client relevant data may be divided by the block size to identify a number of blocks. The number of blocks may then be divided by the period of time (e.g., a portion of a backup period such as $\frac{1}{10}$, $\frac{1}{5}$, etc. of the backup period) to identify a rate of change of blocks per period of time that, if exceeded, indicates that a service device initiated backup should be generated.

In one or more embodiments of the invention, the operation condition may be a change in a rate of change of the blocks storing client relevant data. For example, if a backup period is divided into ten time periods, different periods of time may have different rates of change of the blocks storing client relevant data. The difference between the rates associated with sequential time periods may be used to determine whether to generate a service device initiated backup. The change in the rate of change of the blocks storing the client relevant data may be, for example, a threshold value that if exceeded indicates that a service device initiated backup should be generated.

Any of the operation conditions may be identified and/or set by, for example, an administrator or other person. The operation conditions may be identified and/or set through other methods. For example, automated analysis of previous generation of changes to client relevant data may be performed to identify a set of operation conditions that should result in the generation of a service device initiated backup to meet the requirements of the protection policies.

The backup manager (210) may use the information included in the conditional backup generation repository (226) to program agents thereby causing the data protection services to meet the requirements of the protection policies. For example, the backup manager (210) may provide conditional backup generation operation conditions and/or information derived from the operation conditions to agents to cause the agents to initiate backup generation for service devices to meet protection policy requirements.

The conditional backup generation repository (226) may be maintained by, for example, the backup manager (210). For example, the backup manager (210) may add, remove, and/or modify information included in the conditional backup generation repository (226) (e.g., as specified, for example, by an administrator or other person).

The data structures of the conditional backup generation repository (226) may be implemented using, for example, lists, tables, unstructured data, databases, etc. While illustrated in FIG. 2 as being stored locally, the conditional backup generation repository (226) may be stored remotely and may be distributed across any number of devices without departing from the invention.

While the storage (220) has been illustrated and described as including a limited number and type of data, a storage in accordance with embodiments of the invention may store additional, less, and/or different data without departing from the invention.

While the backup management system (200) has been illustrated and described as including a limited number of specific components, an information handling system in accordance with embodiments of the invention may include additional, fewer, and/or different components without departing from the invention.

Figure 3:
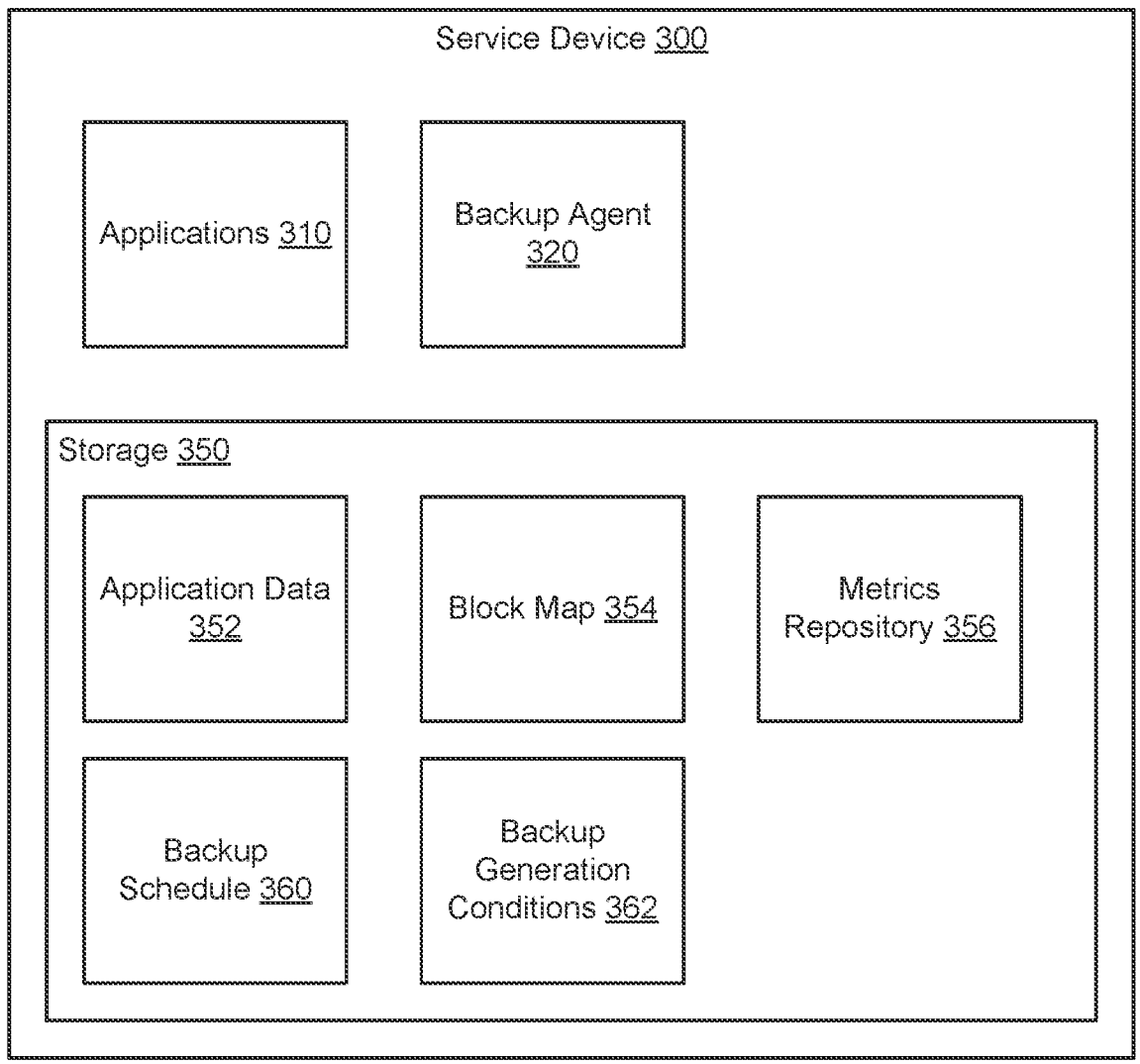
FIG. 3 shows a diagram of a service device in accordance with one or more embodiments of the invention.

Turning to FIG. 3, FIG. 3 shows a diagram of a service device (300) in accordance with one or more embodiments of the invention. The system of FIG. 1 may include any number of service devices (e.g., 120) similar to the service device (300) illustrated in FIG. 3. The service device (300) may provide computer implemented services to clients and/or other entities.

To provide computer implemented services, the service device (300) may include applications (310), a backup agent (320), and storage (350). Each of these components is discussed below.

The applications (310) may provide computer implemented services to other entities. The applications (310) may provide any number and type of computer implemented services. When providing the computer implemented services, the applications (310) may store application data (352) in the storage (350). The application data (352) may include client relevant data. Consequently, failure or inoperability of the service device (300) may prevent clients from utilizing client relevant data. Accordingly, the clients may be unable to provide their respective services.

The backup agent (320) may provide backup services. Backup services may include generating backups for protected assets (e.g., any number of the applications (310)) and storing the generated backups in other locations (e.g., backup storage).

The backups generated by the backup agent (320) may include information usable to restore the protected assets to previous states. For example, the backups may include information based on the application data (352) corresponding to the previous states.

The backup agent (320) may generate backups based on (i) one or more backups schedules (e.g., 360) that specify when backups should be generated for protected assets and (ii) backup generation conditions (e.g., operation conditions that trigger backup generations for protected assets as specified by the backup management system of FIG. 1) stored. The backup agent (320) may be programmed by the backup management system by receiving the operation conditions and/or backup schedule. Once received, the backup agent (320) may store the backup schedule and/or backup generation conditions.

To implement the backup schedule (360), the backup agent (320) may monitor the time and generate backups for protected assets based on points in time indicated by the backup schedule (360).

To implement the backup generation conditions (362), the backup agent (320) may monitor the blocks of the storage (350) that store client relevant data over time. Specifically, the backup agent (320) may (i) intercept or otherwise obtain copies of input-output (TO) to and from the storage (350), (ii) filter the input-output (TO) for changes to blocks that include client relevant data to identify a set of relevant impacted blocks, (iii) filter the set of relevant impacted blocks to identify a subset of the set of impacted blocks that were modified (e.g., included a portion of the client relevant data that changed), (iv) update counters or other data structures reflecting a count of the number of changed blocks that include client relevant data, (v) calculate metrics using the counters which may be used to ascertain whether any of the backup generation conditions (362) are met, and (v) compare the metrics (e.g., stored in a metrics repository (356)) to the backup generation conditions (362) to ascertain whether a service device initiated backup should be generated. The backup agent (320) may then initiate backup generation accordingly. The backups may be generated using any technique without departing from the invention.

To ascertain which of the TO include changes to client relevant data, the backup agent (320) may include a block map (354). The block map (354) may store information relevant to ascertaining whether TO should be processed because it likely includes changes to client relevant data or should be discarded. The block map (354) may include, for example, a listing of segment addresses (e.g., address ranges) where blocks that include client relevant data are stored. The segment addresses included in the TO may be compared to the segment addresses included in the listing to decide whether to process the TO or discard it.

The backup agent (320) may perform its functionality in accordance with programming received from a backup management system. For example, the backup agent (320) may receive information from the backup management system indicating when backups are to be generated, may store the information for future use, and may generate backups in accordance with the stored information.

When providing its functionality, the backup agent (320) may perform all, or a portion, of the method illustrated in FIG. 4.

In one or more embodiments of the invention, one or more of the applications (310) and/or backup agent (320) are implemented using a hardware device including circuitry. The hardware device may be, for example, a digital signal processor, a field programmable gate array, or an application specific integrated circuit. The circuitry may be adapted to cause the hardware device to perform the functionality of the applications (310) and/or the backup agent (320). The applications (310) and/or the backup agent (320) may be implemented using other types of hardware devices without departing from the invention.

In one or more embodiments of the invention, one or more of the applications (310) and/or backup agent (320) are implemented using a processor adapted to execute computing code stored on a persistent storage that when executed by the processor performs the functionality of the applications (310) and/or the backup agent (320). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (350) is implemented using physical devices that provide data storage services (e.g., storing data and providing copies of previously stored data). The devices that provide data storage services may include hardware devices and/or logical devices. For example, storage (350) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (350) may include a memory device (e.g., a dual in line memory device) in which data is stored and from which copies of previously stored data are provided. In another example, storage (350) may include a persistent storage device (e.g., a solid-state disk drive) in which data is stored and from which copies of previously stored data is provided. In a still further example, storage (350) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (350) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (350) may store data structures including, for example, application data (352), a block map (354), a metrics repository (356), a backup schedule (360), and backup generation conditions (362). Each of these data structures is discussed below.

The application data (352) may be implemented using one or more data structures that includes application data.

The applications (310) may use the application data to provide their respective functionalities. For example, the applications (310) may generate, store, and read the application data (352). The application data (352) may be maintained by, for example, the applications (310).

The data structures of the application data (352) may be implemented using, for example, lists, tables, unstructured data, databases, etc. While illustrated in FIG. 3 as being stored locally, the application data (352) may be stored remotely and may be distributed across any number of devices without departing from the invention.

The block map (354) may be implemented using one or more data structures that includes information usable to ascertain whether an IO impacts a block that includes client relevant data. For example, the block map (354) may specify which segments implemented by a management entity or abstraction layer (e.g., a file system, virtualization system, containerization system, etc.) to manage the blocks of the storage (350) are associated with respective blocks of the storage (350) that include client relevant data. Accordingly, when a packet or other request for access to the storage is received by the management entity or abstraction layer, the backup agent (320) may compare information (e.g., a segment identifier) included in the packet to the block map (354) to ascertain whether the IO may impact client relevant data from a protected asset.

For example, the block map (354) may include a list of segments associated with each protected asset. When an IO is received, segment information from the IO may be compared to the list of segments to ascertain whether the IO should be processed.

The block map (354) may be maintained by, for example, the backup agent (320). For example, the backup agent (320) may add, remove, and/or modify information included in the block map (354) (e.g., based on changes in storage locations of various portions of the application data (352), new application data being stored in new locations, etc.).

The data structures of the block map (354) may be implemented using, for example, lists, tables, unstructured data, databases, etc. While illustrated in FIG. 3 as being stored locally, the block map (354) may be stored remotely and may be distributed across any number of devices without departing from the invention.

The metrics repository (356) may be implemented using one or more data structures that includes information usable to ascertain whether a backup generation condition has been met. For example, the metrics repository (356) may include calculations performed by the backup agent (320). For example, the backup agent (320) may perform calculations using counts of changed blocks of the application data (352) for a protected asset to ascertain whether a backup generation condition has been met.

The metrics repository (356) may be maintained by, for example, the backup agent (320). For example, the backup agent (320) may add, remove, and/or modify information included in the metrics repository (356).

The data structures of the metrics repository (356) may be implemented using, for example, lists, tables, unstructured data, databases, etc. While illustrated in FIG. 3 as being stored locally, the metrics repository (356) may be stored remotely and may be distributed across any number of devices without departing from the invention.

The backup schedule (360) may be implemented using one or more data structures that includes information regarding when scheduled backups should be generated. For example, the backup schedule (360) may specify points in times when scheduled backups for protected assets should be generated.

The backup schedule (360) may be maintained by, for example, the backup agent (320). For example, the backup agent (320) may add, remove, and/or modify information included in the backup schedule (360).

The data structures of the backup schedule (360) may be implemented using, for example, lists, tables, unstructured data, databases, etc. While illustrated in FIG. 3 as being stored locally, the backup schedule (360) may be stored remotely and may be distributed across any number of devices without departing from the invention.

The backup generation conditions (362) may be implemented using one or more data structures that includes information regarding when service device initiated backups should be generated. For example, the backup generation conditions (362) may specify operation conditions of the service device (300) that indicate that a service device initiated backup should be generated.

Operation conditions specified by the backup generation conditions (362) may be keyed, at least in part, to the quantity of blocks storing data associated with a protected asset that were changed during a period of time. For example, the operation conditions may specify a number of blocks that if modified during a portion of a backup period trigger generation of a service device initiated backup. Thus, operation conditions may specify rates of block changes that trigger generation of service device initiated backups.

The backup generation conditions (362) may be maintained by, for example, the backup agent (320). For example, the backup agent (320) may add, remove, and/or modify information included in the backup generation conditions (362).

The data structures of the backup generation conditions (362) may be implemented using, for example, lists, tables, unstructured data, databases, etc. While illustrated in FIG. 3 as being stored locally, the backup generation conditions (362) may be stored remotely and may be distributed across any number of devices without departing from the invention.

As discussed above, the system of FIG. 1 may provide data protection services. FIG. 4 illustrates a method that may be performed by components of the system of FIG. 1 to provide data protection services.

FIG. 4 shows a flowchart of a method in accordance with one or more embodiments of the invention. The method depicted in FIG. 4 may be performed to provide data protection services in accordance with one or more embodiments of the invention. The method shown in FIG. 4 may be performed by, for example, a backup management system (e.g., 130, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, copies of storage system transactions are obtained. The copies of the storage system transactions may all be for data of a protected asset (e.g., data associated with an application).

In one or more embodiments of the invention, the storage system transactions are obtained using a backup agent hosted by a service device. Prior to step 400, the backup management system may have programmed the backup agent to provide data protection services for one or more protected assets of the service device that hosts the backup agent. The protected assets may include one or more applications hosted by the service device. The protected assets may store data that include client relevant data in the service device.

In one or more embodiments of the invention, the agent, on behalf of the data management system, sends a request for copies of storage system transactions to be provided to a management entity of the service device (e.g., a file system, operating system, or other entity tasked with managing storage of data using hardware devices of the service device). The agent, on behalf of the data management system, may obtain the storage system transactions from the management entity (e.g., via message passing, shared memory communications, etc.).

The storage system transactions may include any number of storage access requests. Each of the storage access requests may request to (i) read, (ii) modify, (iii) delete, and/or (iv) otherwise utilize data stored in storage of the service device (and/or other locations, even remote to the service device).

In one or more embodiments of the invention, the backup agent intercepts copies of the storage system transactions. In other words, the backup agent may obtain the copies of the storage system transactions without permission or cooperation from the entities tasked with managing storing and providing access to data. For example, the backup agent may read predetermined memory locations in which storage access requests are stored prior to processing.

In one or more embodiments of the invention, the backup agent obtains copies of the storage system transactions by receiving them from the requesting entities. For example, the backup agent may instruct or otherwise cause the requesting entities (e.g., applications hosted by the service device and/or other devices) to provide copies of storage system transactions to the backup agent, in addition to other entities.

In step 402, the copies of the storage system transactions are filtered based on a block level filter for a portion of the blocks of the storage system to identify a portion of the storage system transactions that impact one or more of the protected assets.

In one or more embodiments of the invention, the block level filter is the list (and/or information derived using the list) of blocks, segments, or other identifiers of storage resources (e.g., provided by the storage of the service device or another device) that are associated with protected assets. The list may be stored as part of the block map (354, FIG. 3).

In one or more embodiments of the invention, the copies of the storage system transactions are filtered using the block level filter by comparing identifiers in the storage system transactions to the information included in the block level filter. Each comparison may indicate whether the corresponding storage system transaction should be filtered out resulting in the remaining storage system transactions being the portion of the storage system transactions that impact one or more of the protected assets.

The information included in the block level filter may be inclusive (e.g., indicate storage system transactions that are part of the portion of the storage system transactions) or exclusive (e.g., indicate storage system transactions that are not to be part of the portion of the storage system transactions) or a combination of inclusive and exclusive.

For example, consider a scenario where a storage system has segments with identifiers of A, B, C, and D and a block level filter of A and C. Next consider receiving the following series of storage system transactions: 1—Read Segments A, block 15-77, B, blocks 8-14; 2—Write New Data to Segment D, blocks 1-5; and 3—Delete Segment C, blocks 35-38. In this scenario, storage system transaction 2 is filtered out because it does not impact segments A or C thereby leaving storage system transactions 1 and 3 for further processing.

In one or more embodiments of the invention, the storage system transactions include identifiers of segments, blocks, or other information usable to identify which blocks of storage are impacted by the transactions.

In step 404, at least one data protection metric based on the portion of the storage system transactions is obtained.

In one or more embodiments of the invention, the data protection metric is a discretized rate of change of client relevant data. To obtain the data protection metric, a current backup period (e.g., from when the last scheduled to when the next scheduled backup is generated) may be divided into a predetermined number of portions. In one or more embodiments of the invention, the predetermined number is ten. The predetermined number may be other numbers (e.g., 5, 8, 15, 20, etc.) without departing from the invention.

Based on the number of portions and an allowable quantity of the protected asset data that may be exposed to loss (without violating protection requirements), an allowable number of changed blocks may be identified. The allowable number of changed blocks may be calculated by dividing the quantity of the protected asset data by the number of portions to identify a per portion allowable quantity of the protected asset data that may be exposed to loss. The per portion allowable quantity of the protected asset data may be divided by the size of the blocks in which the protected asset data is stored to identify the allowable number of changed blocks.

In one or more embodiments of the invention, the at least one data protection metric is obtained by reading it from a metrics repository. For example, as noted with respect to FIG. 3, the metric repository may include any number of metrics (e.g., data protection metrics).

In step 406, it is determined whether the at least one data protection metric indicates that scheduled backups will not provide a predetermined level of data protection.

The determination may be made by (i) calculating values specified by the at least one data protection metric based on the filtered copies of the storage system transactions and (ii) comparing the calculated values to the corresponding data protection metrics. If the values do not meet the requirements of the metrics, then it may be determined that the at least one data protection metric indicates that scheduled backups will not provide the predetermined level of data protection (e.g., as specified by protection policies).

In one or more embodiments of the invention, the values are calculated by identifying the number of blocks of the protected asset during each time period that are modified in a manner that would require a backup to obtain if the service device failed or otherwise became inoperable. To identify the number of blocks during each time period, the operations specified by the portion of the storage system transactions during each respective time period may be compared to operations that are known to modify blocks in a manner that requires a backup for reproduction. By doing so, a list of time periods (during a backup period) and corresponding numbers of changed blocks may be obtained.

The values may then be obtained using the numbers of changed blocks during each time period resulting in a list of metrics for each time period. As new time periods occur, the listing may be updated.

To compare the calculated values to the corresponding data protection metrics, the values of metrics obtained for the current time period may be compared to the metrics. The comparison may determine whether the values fall within or outside of ranges specified by the values of the metrics. Fall inside or outside of the ranges may indicate whether the scheduled backups will not provide the predetermined level of data protection.

If it is determined that the scheduled backups will not provide the predetermined level of data protection, then the method may proceed to step 408 following step 406. If it is determined that the scheduled backups will provide the predetermined level of data protection, then the method may end following step 406.

In step 408, a service device initiated backup is generated.

In one or more embodiments of the invention, the service device initiated backup is generated by the backup agent for the backup management system. For example, the backup management system may have programmed the backup agent to automatically initiate generation of a service device initiated backup in response to it being determined that the scheduled backups will not provide the predetermined level of data protection.

In one or more embodiments of the invention, the backup management system generates the service device initiated backup by instructing the backup agent to generate the backup.

The backup agent may generate the service device initiated backup using any method without departing from the invention. For example, the backup agent may generate the backup by generating a disk image, partial disk image, may record changes to the data of the protected asset subsequent to its last backup and store the changes as a backup, etc.

In step 410, the service device initiated backup is stored in backup storage.

In one or more embodiments of the invention, the storage management system stores the backup in backup storage using the backup agent. For example, the storage management system may have programmed the backup agent to store the generated service device initiated backup in a particular backup storage. Thus, the backup agent on behalf of the backup storage system may store the service device initiated backup in backup storage.

In step 412, a backup schedule for the one or more protected assets is remediated based on the service device initiated backup.

In one or more embodiments of the invention, the backup schedule is remediated by time shifting the next scheduled backup (and/or all scheduled backups to be subsequently generated) to the end of a backup period. In other words, because an unscheduled backup for the data protection asset has been generated, generating the next scheduled backup as scheduled may be premature (e.g., not be needed to meet a level of data protection to be afforded to the protected asset). Rather than prematurely generating the scheduled backup, the scheduled backup may be time shifted into the future to a point in time where it will be necessary to meet the level of data protection to be afforded to the protected asset.

By doing so, the computational cost for generating backups may be reduced by avoiding the premature generation of scheduled backups. Further, because service device initiated backups may still be generated, there is little risk to delaying the scheduled backup.

Once the backup schedule is remediated, one or more backup agents may be reprogrammed based on the remediated backup schedule.

The method may end following step 412.

Using the method illustrated in FIG. 4, a system in accordance with embodiments of the invention may reduce the likelihood of failing to meet prescribed levels of data protection while reducing the computational cost for providing the prescribed levels of data protection by avoid premature generation of backups.

To further clarify embodiments of the invention, a non-limiting example is provided in FIGS. 5.1-5.6. These figures illustrate diagrams of the operation of a system similar to that of FIG. 1 over time. Specifically, these figures show graphs of the rate of changes of blocks that store data of a protected asset over time. In each of the figures, the time between scheduled backups (e.g., a backup period) is also illustrated. Further, a data protection metric in the form of a threshold is also shown as a horizontal dashed line. The threshold indicates a rate of changes to blocks of the protected asset that triggers the generation of a service device initiated backup.

Example

Consider a scenario in which an insurance company stores customer data in a database hosted by service device. This information may be very valuable to the insurance company. Consequently, the insurance company may enter into an agreement with the provider of the service device to limit the amount of data of the database that may be subject to loss due to a failure of the service device.

For this example, the amount of data is 100 GB in an 8-hour period. Based on this information, the provider determines that scheduled backups generated every eight hours will provide the level of data protection specified by the insurance company. Accordingly, the administrator tasked with managing the service device sets backup generations for every eight hours.

To hedge against unexpected operation of the service device, the administrator also sets a threshold as illustrated in FIG. 5.1. In this example, the value of the threshold is calculated by dividing 100 GB by 10 (i.e., 10 GB) to identify the quantity of data that may be changed during any time period. The number of blocks that may be changed is then calculated by dividing the quantity of data that may be changed during the time period by the block size. For the purposes of this example, assume that that block size is 1 MB resulting in the number of changed blocks being 10,000. The threshold may then be calculated by dividing the number of changed blocks by the time period. In this example, 10,000 per one hour.

A backup management system then programs a backup agent hosted by the service device based on the backup schedule and threshold. Consequently, the service device will generate a scheduled backup every 8 hours and/or a service device initiated backup if the block change rate exceeds the threshold.

Turning to FIG. 5.1, FIG. 5.1 shows a graph of the block change rate over time beginning at midnight. On the horizontal bar, each one hour after midnight is indicated by a tick. For the purposes of this example, presume that the backup schedule indicates that a backup will be generated at 2:00 AM, 10:00 AM, and 6:00 PM, daily.

Between midnight and 3 AM, the block rate change, indicated on the vertical bar of the graph, slowly increases.

At 3 AM, the backup agent calculates, for the 2 AM-3 AM window, the average rate at which blocks were changed. As seen in FIG. 5.1, the average is less than the threshold. Consequently, a service device backup is not generated and stored in backup storage because it is likely that the scheduled backups will provide the prescribed level of data protection for the database.

FIGS. 5.2-5.6 show similar graphs of the block change rate over time for the time periods of 3 AM-4 AM, 4 AM-5 AM, 5 AM-6 AM, 6 AM-7 AM, and 8 AM-9 AM, respectively.

Turning to FIG. 5.2, at 3:00 AM, a significant weather system impacts the region in which the insurance company sells insurance resulting in damage to its insured customers' property. Consequently, the insurance company begins to receive large numbers of claims from its customers. The insurance company begins to more rapidly store data in its database. Accordingly, as seen in FIG. 5.2, the block change rate begins to increase more rapidly.

At 4 AM, the backup agent calculates, for the 3 AM-4 AM window, the average rate at which blocks were changed. As seen in FIG. 5.2, the average is less than the threshold. Consequently, a service device backup is not generated and stored in backup storage because it is likely that the scheduled backups will provide the prescribed level of data protection for the database.

Turning to FIG. 5.3, from 4:00 AM to 5:00 AM the insurance company continues to receive large and increasing numbers of claims from its customers. The insurance company begins to even more rapidly store data in its database. Accordingly, as seen in FIG. 5.3, the block change rate begins to increase even more rapidly and, for the last few minutes of the hour, exceeds the threshold.

At 5 AM, the backup agent calculates, for the 4 AM-5 AM window, the average rate at which blocks were changed. As seen in FIG. 5.3, the average is less than the threshold. Consequently, a service device backup is not generated and stored in backup storage, even though the threshold was exceeded for a portion of the hour, because it is likely that the scheduled backups will provide the prescribed level of data protection for the database.

Turning to FIG. 5.4, from 5:00 AM to 6:00 AM the insurance company begins to receive fewer numbers of claims from its customers because the weather system has left the region. The insurance company stores data less frequently in its database due to the lower numbers of claims being received. Accordingly, as seen in FIG. 5.4, the block change rate begins to decrease.

At 6 AM, the backup agent calculates, for the 5 AM-6 AM window, the average rate at which blocks were changed. As seen in FIG. 5.4, the average is less than the threshold. Consequently, a service device backup is not generated and stored in backup storage because it is likely that the scheduled backups will provide the prescribed level of data protection for the database.

Turning to FIG. 5.5, at 6:00 AM, more insured customers being waking up and identifying that their properties have been damaged. Accordingly, the insurance company begins receiving claims and storing corresponding data in its database at a more rapid pace.

At 7 AM, the backup agent calculates, for the 6 AM-7 AM window, the average rate at which blocks were changed. As seen in FIG. 5.5, the average is less than the threshold. Consequently, a service device backup is not generated and stored in backup storage because it is likely that the scheduled backups will provide the prescribed level of data protection for the database.

Turning to FIG. 5.6, at 7:00 AM, insured customers continue to put in claims with the insurance company at a slowly increasing rate. Accordingly, the insurance company increase the rate at which blocks of the database are being changed.

At 8 AM, the backup agent calculates, for the 7 AM-8 AM window, the average rate at which blocks were changed. As seen in FIG. 5.6, the average is greater than the threshold. Consequently, a service device initiated backup is generated and stored in backup storage because it is likely that the scheduled backup that will be generated at 10 AM is unlikely to provide the prescribed level of data protection for the database. Consequently, between now and 10 AM, it is likely that an unacceptable quantity of data (i.e., 100 GB in this example) stored in the database could be lost if the service device fails (even though that quantity has not yet been exceeded).

By generating and storing the service device initiated backup for the service device, the provider of the service device may be more likely to meet its contractual obligations to the insurance company.

After generating the service device initiated backup, the backup management system calculates a new backup scheduled. Specifically, the backup management system pushes the points in time for generating the scheduled backups from 2 AM, 10 AM and 6 PM to 8 AM, 4 PM, and midnight, respectively. By doing so, scheduled backups may continue to be generated that are likely to meet the data protection requirements while avoiding premature backup generation (e.g., generating a scheduled backup at 10 AM following generation of a service device initiated backup at 8:00 AM).

End of Example

Figure 6:
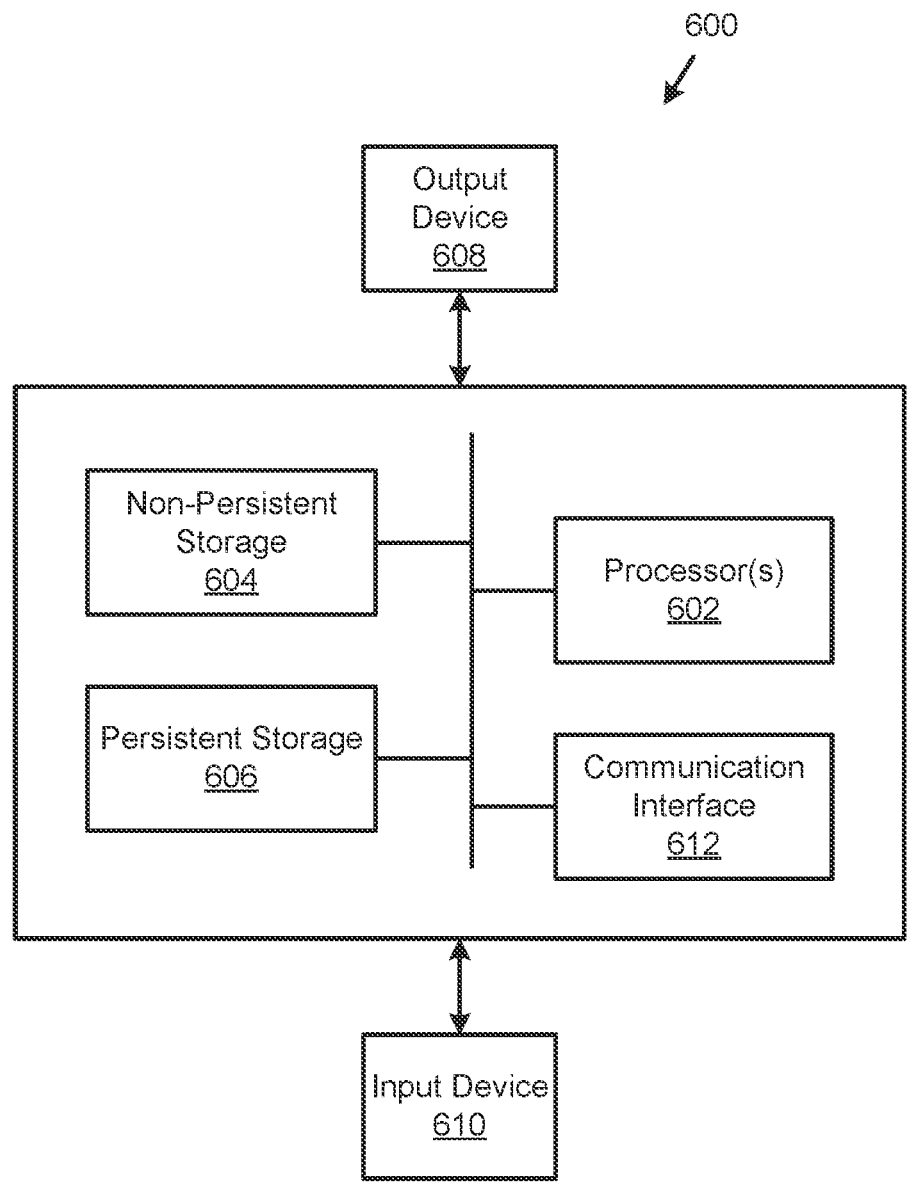
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for providing data protection services. Specifically, embodiments of the invention may provide methods for generating backups that ensure data protection requirements are met while reducing the likelihood of premature backup generation. To do so, the system may identify the rates of changed blocks corresponding to protected assets. These rates may be compared to metrics that indicate whether a backup should be generated. If such a backup is generated, a schedule for generating scheduled backups may be updated to reflect the generation of an unscheduled backup.

Thus, embodiments of the invention may address the problem of limited computing resources in a system. For example, by generating service device initiated backups in response to the occurrence of predetermined rates of changes of blocks of protected assets, longer periods of time between backup generation in a backup schedule may be used without jeopardizing the level of data protection to be afforded to protected assets.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A backup management system for providing data protection services to service devices that provide computer implemented services for clients and host protected data assets used to provide the computer implemented services to the clients, comprising:

storage for storing:
a backup schedule for a protected data asset of the protected data assets hosted by a service device of the service devices, and
a conditional backup generation repository that specifies when un-scheduled backups for the service device are to be generated; and
a processor programmed to:
filter copies of storage system transactions of the service device using a block level filter to identify a portion of the storage system transactions impacting the protected data asset;
obtain at least one data protection metric based on the portion of the storage system transactions;
make a determination that the at least one data protection metric indicates that the backup schedule will not provide the protected data asset with a predetermined level of data protection;
in response to the determination:
generate a service-device initiated backup for the protected data asset;
store the service-device initiated backup in backup storage; and
remediate the backup schedule based on the service-device initiated backup.

2. The backup management system of claim 1, wherein the at least one data protection metric comprises:
a rate of change of data stored in blocks of a storage system that store the protected data asset during a period of time.

3. The backup management system of claim 2, wherein the period of time is a portion of a backup schedule period between backup generations specified by the backup schedule.

4. The backup management system of claim 1, wherein the at least one data protection metric comprises:
a difference between a first number of blocks of a storage system that store the protected data asset during a first period of time and a second number of blocks of the storage system that store the protected data asset during a second period of time.

5. The backup management system of claim 4, wherein the first period of time is a first portion of a backup schedule period between backup generations specified by the backup schedule.

6. The backup management system of claim 5, wherein the second period of time is a second portion of the backup schedule period between the backup generations specified by the backup schedule.

7. The backup management system of claim 5, wherein the first period of time and the second period of time have a same duration.

8. The backup management system of claim 1, wherein filtering the copies of the storage system transactions of the service device using the block level filter to identify the portion of the storage system transactions impacting the protected data asset comprises:
adapting an agent hosted by the service device to:
identify blocks of a storage system storing any of the protected data asset;
obtain the copies of the storage system transactions from a storage system abstraction layer hosted by the service device; and
discard a second portion of the storage system transactions that do not impact the identified blocks to identify the portion of the storage system transactions.

9. The backup management system of claim 1, wherein the service-device initiated backup for the protected data asset is an unscheduled backup that is not based on the backup schedule.

10. The backup management system of claim 1, wherein the processor is further programmed to generate a scheduled backup for the protected data asset based on a backup generation time specified by the backup schedule.

11. A method for providing data protection services to service devices that provide computer implemented services for clients and host protected data assets used to provide the computer implemented services to the clients, comprising:
filtering copies of storage system transactions of a service device of the service devices that hosts a protected data asset of the protected data assets using a block level filter to identify a portion of the storage system transactions impacting the protected data asset;
obtaining at least one data protection metric for the protected data asset based on the portion of the storage system transactions;
making a determination that the at least one data protection metric indicates that a backup schedule will not provide the protected data asset with a predetermined level of data protection;
in response to the determination:
generating a service-device initiated backup for the protected data asset;
storing the service-device initiated backup in backup storage; and
remediating the backup schedule based on the service-device initiated backup.

12. The method of claim 11, wherein the at least one data protection metric comprises:
a rate of change of data stored in blocks of a storage system that store the protected data asset during a period of time.

13. The method of claim 12, wherein the period of time is a portion of a backup schedule period between backup generations specified by the backup schedule.

14. The method of claim 11, wherein the at least one data protection metric comprises:
a difference between a first number of blocks of a storage system that store the protected data asset during a first period of time and a second number of blocks of the storage system that store the protected data asset during a second period of time.

15. The method of claim 14, wherein the first period of time is a first portion of a backup schedule period between backup generations specified by the backup schedule.

16. A non-transitory computer readable medium comprising computer readable program code, which when executed by a computer processor enables the computer processor to perform a method for providing data protection services to service devices that provide computer implemented services for clients and host protected data assets used to provide the computer implemented services to the clients, the method comprising:
filtering copies of storage system transactions of a service device of the service devices that hosts a protected data asset of the protected data assets using a block level filter to identify a portion of the storage system transactions impacting the protected data asset;
obtaining at least one data protection metric for the protected data asset based on the portion of the storage system transactions;

making a determination that the at least one data protection metric indicates that a backup schedule will not provide the protected data asset with a predetermined level of data protection;
in response to the determination:
generating a service-device initiated backup for the protected data asset;
storing the service-device initiated backup in backup storage; and
remediating the backup schedule based on the service-device initiated backup.

17. The non-transitory computer readable medium of claim 16, wherein the at least one data protection metric comprises:
a rate of change of data stored in blocks of a storage system that store the protected data asset during a period of time.

18. The non-transitory computer readable medium of claim 17, wherein the period of time is a portion of a backup schedule period between backup generations specified by the backup schedule.

19. The non-transitory computer readable medium of claim 16, wherein the at least one data protection metric comprises:
a difference between a first number of blocks of a storage system that store the protected data asset during a first period of time and a second number of blocks of the storage system that store the protected data asset during a second period of time.

20. The non-transitory computer readable medium of claim 19, wherein the first period of time is a first portion of a backup schedule period between backup generations specified by the backup schedule.

* * * * *